(12) United States Patent
Boman

(10) Patent No.: US 6,304,211 B1
(45) Date of Patent: Oct. 16, 2001

(54) SYSTEM AND METHOD FOR MEASURING DISTANCE BETWEEN TWO OBJECTS USING RECEIVED SATELLITE TRANSMITTED DATA

(76) Inventor: Bertho Boman, 11600 NW. 20$^{th}$ St., Fort Lauderdale, FL (US) 33323

(*) Notice: Subject to any disclaimer, the term of this patent is extended or adjusted under 35 U.S.C. 154(b) by 0 days.

(21) Appl. No.: 09/504,692

(22) Filed: Feb. 16, 2000

(51) Int. Cl.$^7$ ............................... H04B 7/185; G01S 5/02
(52) U.S. Cl. ................................ 342/357.08; 342/357.09; 342/357.1; 701/215
(58) Field of Search .................... 342/357.08, 357.09, 342/357.1; 701/215, 300, 301, 302

(56) References Cited

U.S. PATENT DOCUMENTS

| | | |
|---|---|---|
| 4,815,020 | 3/1989 | Cormier . |
| 4,864,854 | 9/1989 | Van Leemput . |
| 4,870,687 | 9/1989 | De Leon . |
| 4,894,656 | 1/1990 | Joguet et al. . |
| 4,949,089 | 8/1990 | Ruszkowski, Jr. . |
| 4,977,509 | 12/1990 | Pitchford et al. . |
| 5,056,106 | 10/1991 | Wang et al. . |
| 5,272,483 | 12/1993 | Kato . |
| 5,324,028 | 6/1994 | Luna . |
| 5,364,093 | 11/1994 | Huston et al. . |
| 5,434,789 | 7/1995 | Fraker et al. . |
| 5,438,518 | 8/1995 | Bianco et al. . |
| 5,469,175 | 11/1995 | Boman . |

FOREIGN PATENT DOCUMENTS 3134513   10/1989   (JP) .

OTHER PUBLICATIONS

The Application of Navstar Differential GPS in the Civilian Community—1984 by Jaeques Beser & Bradford Parkinson/Navigation vol. II.

*Primary Examiner*—Theodore M. Blum
(74) *Attorney, Agent, or Firm*—Kenneth E. Merklen

(57) ABSTRACT

A global position satellite receiver (GPS receiver) is located in a fixed, undefined location on or in the vacinity of a golf course. The distance and direction between the fixed GPS receiver and a pin on the green of a hole on the golf course is measured using conventional distance and direction measuring apparatus. This is a first measured leg. A mobile GPS receiver, with computer, is on the golf course. A golf ball is on the fairway of the hole. The fixed GPS receiver receivers first global position satellite signals (GPS Data) from global position satellites in orbit above the earth, the first GPS Data defining a location for the fixed GPS receiver. The mobile GPS receiver receives second GPS Data from the global position satellites which defines a location for the mobile GPS receiver. Both sets of GPS Data are identically contaminated and both location definitions are unreliable, in accuracy. The first GPS Data and the second GPS Data are mathematically calculated to derive the distance and direction between the fixed GPS receiver and the mobile GPS receiver. This is a derived leg. The distance and direction between the mobile GPS receiver and the golf ball on the fairway are measured using conventional distance and direction finding apparatus. This is a second measured leg. The derived leg and the second measured leg are mathematically combined to calculate the distance and direction between the fixed GPS receiver and the golf ball. This is the first calculated leg. The first measured leg and the first calculated leg are mathematically combined to calculate the distance and direction between the golf ball on the fairway and the pin.

34 Claims, 7 Drawing Sheets

|  | A | B | D |
|---|---|---|---|
| t¹ | W 80° 18' 41.7781"<br>X<br>N 26° 05' 22.5491" | W 80° 18' 41.7733"<br>X<br>N 26° 05' 22.5477" | W .0048"<br>= X<br>N .0014" |
| t² | W 80° 18' 41.7769"<br>X<br>N 26° 05' 22.5521" | W 80° 18' 41.7721"<br>X<br>N 26° 05' 22.5507" | W .0048"<br>= X<br>N .0014" |
| t³ | W 80° 18' 41.7759"<br>X<br>N 26° 05' 22.5493" | W 80° 18' 41.7711"<br>X<br>N 26° 05' 22.5479" | W .0048"<br>= X<br>N .0014" |

SYSTEM AND METHOD FOR MEASURING DISTANCE BETWEEN TWO OBJECTS USING RECEIVED SATELLITE TRANSMITTED DATA

BACKGROUND OF THE INVENTION

1. Field of the Invention

The present invention relates to an improved system and method, using location defining data from global position satellites, to measure the precise distance between two objects on the surface of the earth. The invention is especially useful for accurately measuring the distance and direction between two objects on a golf course, such as the distance and direction between the hole or pin on a green associated with a fairway on a golf course and a golf cart located along the fairway, or the distance and direction between the hole or pin on a green associated with a fairway of the golf course or a hazard on the golf course and a golf ball on the fairway of the golf course, or the distance and direction between the club house of a golf course and a golf cart on the golf course.

2. Prior Art

For the sake of clarity, the term "hole" when used hereinafter shall refer to a combination of a teeing ground or tee, a fairway and a putting green associated with the fairway, on a golf course. It is well known in the field of golf, that a normal golf course consists of eighteen (18) holes; that each hole has a tee, a fairway and a green; and, that each green has a Hole or pin (hereinafter referred to as "pin") into which the golf ball is holed by a golf player (hereinafter referred to as "player"). These terms and their meaning, when used in reference to the game of golf are well known to persons knowledgeable in golf and it is in such context that these terms are used herein.

It is usual to inform a player the distance, in yardage, between the tee and the green for each hole on the golf course. However, in most cases, the pin on the green is moved from time to time and, for convenience of the golf club, the distance between the tee and the green is measured and given from approximately the geographical center of the teeing ground to approximately the geographical center of the green. This approximation is used despite the fact that the pin on the green is very seldom located at the geographical center of the green. Often, the distance between the tee and the green exceeds the distance a player drives the golf ball from the tee. When a player drives the golf ball short of the green, the player is left on his own to determine the distance or yardage between the golf ball on the fairway and the pin on the green of the hole being played.

The size, in area, of the green depends on the design of the golf course and, in many instances, the green may be a relatively large area. The pin, which is a hole in the green, not exceeding 108 mm in diameter and at least 100 mm in depth, (according to the 1996 Rules of Golf, published and copyrighted, 1995, by the United States Golf Association and The Royal and Ancient Golf Club of St. Andrews, Scotland) may be positioned anywhere on the green. The player, when addressing the green with his golf ball from the fairway, is most interested in knowing the distance, in yardage, as accurately as possible, between the golf ball on the fairway and the pin on the green associated with that fairway.

U.S. Pat. No. 4,815,020 to Cornier, issued Mar. 21, 1989 teaches that the distance between a golf ball and the green remaining after the tee-off flight of the golf ball, may be determined by measuring the distance of the flight of the golf ball from the tee and calculating the distance between the golf ball and the green, since the distance between the tee and the green is already known. The Cormier teaching provides for measuring the distance of the flight of the golf ball from the tee using dead reckoning, such as a wheel operated counter on a hand-drawn golf bag caddie cart, for example. The counter counts the revolutions of a wheel on the caddie cart as the caddie cart is pulled from the tee to the location of the golf ball on the fairway. This Cormier teaching leaves much to be desired. The basic measurement of distance used by Cormier is the distance from the center of the tee to the center of the green, not necessarily to the pin on the green. Cormier does not teach where, or how to find where, on the green, the pin is located. And, measuring distance by counting rotations of a wheel on a cart pulled across a rough terrain, is highly inaccurate because of the roughness of the terrain, slippage of the wheel and/or indirect routing of the cart.

U.S. Pat. No. 5,056,106 to Wang et al, issued Oct. 8, 1991 teaches that distances between a golf player and predetermined objects located on a golf course may be determined by using a plurality of radio transmitters positioned throughout the vicinity of the golf course. The radio transmitters, in predetermined locations, broadcast codified, spread-spectrum RF signals which are received by a hand-held receiver/processor which computes distances between the receiver and objects on the golf course. The teaching of Wang et al is overly complicated and expensive in equipment, installation and maintenance.

It is well known that the United States government has placed a plurality of global position satellites in orbit above the earth. The global position satellites (hereinafter referred to as "GPS") transmit RE carriers on which time and timing signal data are modulated. The GPS transmissions (hereinafter referred to as "GPS Data") may be received by a global position signal receiver (hereinafter referred to as "GPS receiver"). The GPS Data, received by a GPS receiver, may be translated or converted into location defining data, such as latitude and longitude coordinates, for example, that define an exact location, on earth, for the antenna of the GPS receiver receiving the GPS Data.

It is also known that the United States government has caused a contamination of the signals transmitted by the satellites in the global position indicating system. The contamination affects the GPS Data, causing a randomly occurring and changing inaccuracy in the location defined for the GPS receiver receiving GPS Data from satellites in the GPS system. The inaccuracy occurs and changes randomly, with time, in direction and in magnitude. Since the inaccuracy in the location defined for a GPS receiver receiving GPS Data is random in both occurrence and change, the location defined for a GPS receiver may be accurate or inaccurate, with respect to it actual location. Thus, although the GPS Data is correctly translated or converted, the location defined for the receiving GPS receiver may be accurate or inaccurate, the inaccuracy of the location defined being off-set from the actual, true location, in any direction, plus or minus, by as much as forty yards.

It is also known that the inaccuracy between the actual location of a GPS receiver and the location defined by the GPS Data received by the GPS receiver, can be corrected. Information relating to the global satellite location indicating system and the inaccuracy of the location data transmitted by the satellites and how to correct such inaccuracy, is reported in a paper, "The Application of NAVSTAR Differential GPS in the Civilian Community" by Jaques Beser and Bradford W. Parkinson, published in NAVIGATION, Vol.II, 1984.

U.S. Pat. No. 5,364,093 to Huston et al, issued Nov. 15, 1994 teaches that the distance between the pin on a green and a mobile cart may be determined using GPS Data transmitted from GPS when the exact location of the pin on the green and the exact location of the mobile golf cart are each known. The Huston et al teaching provides for previously determining the exact location of the pin on the green, by independent means. The mobile cart is provided with a GPS receiver and a computer. The GPS receiver receives GPS Data which, when translated, defines an inaccurate location for the mobile cart. A differential or error correction signal is used to change the inaccurate location of the golf cart to a correct location. The distance between the accurate location of the mobile golf cart and the previously determined location of the pin on the green is then calculated from two defined accurate locations.

The differential or error correction signal is generated by comparing position locating data derived from GPS Data received by a fixedly located GPS receiver with previously determined, corresponding position locating data defining the exact, correct location of the fixedly located GPS receiver. The differential signal is transmitted to the mobile GPS receiver on the golf cart. The exact location of the mobile cart is determined by correcting the GPS Data defining the inaccurate location of the mobile GPS receiver on the golf cart with the differential signal.

Huston et al, in their U.S. Pat. No. 5,364,093 patent teach measuring distance between a golf cart and the pin on the green. This leaves the player to measure the distance between the golf ball on the fairway and the pin on the green because golf carts are normally not permitted to trespass on the fairway of the golf course.

The U.S. Pat. No. 5,434,789 to Fraker et al, issued Jul. 18, 1995 teaches a golf diagnostic system which uses GPS Data for plotting locations for measuring the flight of a golf ball and for measuring distance between the GPS receiver and other previously known locations on the golf course. The teaching includes using differential or error correction signals generated by and transmitted from a fixed GPS receiver, located in a previously known and defined location, to adjust location coordinates, for accuracy. However, the teachings of both Huston et al, '093 and Fraker et al, '789 require the generation of differential or error correction signals. It is also necessary, in both teachings, to know the exact, defined location of at least one GPS receiver, in terms compatible with the GPS Data, in order to compare the GPS Data defined location with the actual location in order to generate a differential signal. The differential signal must be applied to a second GPS Data defining the location of a second GPS receiver in order to determine the correct location of the second GPS receiver. It is further necessary to know the exact, defined location of the pin in order to measure distance between the pin and a mobile GPS receiver.

The U.S. Pat. No. 5,438,518 to Bianco et al, issued Aug. 1, 1995 teaches that a digitized map of a golf course, stored in the memory of a computer, may be used to plot the location of a mobile unit on a golf course when GPS Data are received by the mobile unit. Raw GPS Data, defining an inaccurate location for the mobile unit, is corrected using a differential signal generated using location data translated from GPS Data and the previously known, correspondingly defined, actual location of a fixed GPS receiver. The location defined by the GPS Data, received by the fixed GPS receiver, is compared with corresponding data defining the known, exact location of the fixed GPS receiver and a differential signal is generated. The differential signal is transmitted to the mobile unit in order to correct the location of the mobile unit for position plotting.

The U.S. Pat. No. 5,469,175 to Boman, issued Nov. 21, 1995 teaches a system and method for accurately measuring the distance between a golf ball on a fairway and the pin on the green. The accurate location of a mobile golf cart carrying a GPS receiver is determined by correcting the inaccurate location derived from GPS Data received by the GPS receiver on the golf cart, using a differential or error correction signal The differential signal is generated by comparing GPS Data defining, inaccurately, the location of a fixed GPS receiver, with corresponding signal data defining the accurate location of the fixed GPS receiver. When the corrected location of the GPS receiver mounted on the golf cart is determined, the corrected location of the mobile GPS receiver is adjusted by the distance and direction between the golf ball on the fairway and the golf cart. This provides an accurate location of the golf ball on the fairway. The exact location of the pin is already known, and defined in corresponding location defining data and the distance between the golf ball on the fairway and the pin is calculated.

Each of the U.S. Pat. Nos. 5,364,093; 5,434,789; 5,438,518; and, 5,469,175 provides for correcting or changing GPS Data, with a differential or error correction signal, in order to convert an inaccurate location, derived from the GPS Data, to data that defines accurately a location for the GPS receiver. However, related differential or error correction data must first be determined and generated using GPS Data and the exact, previously defined location of a GPS receiver, which is defined in terms comparable with the GPS Data received from the global position satellites. After obtaining a corrected location of a mobile golf cart, distance between the golf cart and the pin is measured only when the exact location, of the pin is also previously known and defined in corresponding terms. These limitations are avoided by the present invention.

U.S. Pat. No. 4,949,089 to Ruszkowski, Jr. teaches a target locator system which uses the global position satellite system to provide location coordinates for a mobile target locator. The mobile target locator measures the distance, direction and inclination between the target and the mobile target locator. Location coordinates for the target are then generated by mathematically calculating the location coordinates for the target locator, obtained from the global position satellite system, with the measured distance, direction and inclination between the target locator and the target, providing a set of location coordinates for the target. The generated target location coordinates are transmitted to the weapons delivery system, which now has the location coordinates for the target.

SUMMARY OF THE INVENTION

The present invention takes advantage of the fact that when the locations of two spaced objects are each defined in corresponding location defining terms, such as latitude and longitude or other grid coordinates, for example, the difference between the two corresponding location defining terms is the distance and direction between the two objects. This is true if correct locations are defined or incorrect locations are defined, so long as both data defining the respective locations are correspondingly accurate or both data are correspondingly inaccurate.

The present invention provides a method, apparatus and/or system for accurately measuring the distance and direction between two objects using the raw, contaminated GPS Data transmitted from GPS satellites in orbit and received by each of two GPS receivers. The present invention avoids decontaminating the GPS Data and avoids determining and/or defining and/or identifying the actual true location of either or both objects and/or GPS receivers before, during or after measuring the distance and direction between the two objects. The present invention provides for accurately measuring such distance and direction without changing or correcting the GPS Data received or changing or correcting the locations defined by the GPS Data. Accuracy in the location defined for the same site, by successive transmissions of GPS Data, changes randomly, with time. It has been found that the contamination causing inaccuracy in the GPS Data received at substantially the same time, by two GPS receivers, is identical for each GPS receiver. In practicing the present invention, the difference between identically contaminated GPS Data received by each of two GPS receivers at substantially the same time, is determined and from the difference between the two sets of identically contaminated GPS Data, the distance and direction between the two GPS receivers is accurately determined.

In accordance with the invention, two (sets of) GPS Data, each in its raw, contaminated, unreliable state, received at substantially the same time, by each of two GPS receivers, are used to accurately measure the distance between two objects and the direction of such distance. Two spaced GPS receivers, which may represent one each of two spaced objects or the location of two spaced objects, respectively, located in two undefined locations, are provided. Each GPS receiver receives GPS Data from GPS satellites, i.e., global position satellites. Each set of GPS Data, received by each respective GPS receiver, is translatable into a location defining data, which defines a location for the GPS receiver receiving the particular GPS Data. Although the locations for the GPS receivers defined by GPS Data are inaccurate, with respect to defining the exact locations of the receiving GPS receivers, the inaccuracies are identical and the locations defined can be used to determine the distance between the two GPS receivers and the direction of that distance. A computer or data processing means is provided to receive and combine at least two sets of raw GPS Data, at least one set from each of two GPS receivers, for mathematically calculating the difference between two sets of GPS Data. The difference between the two sets of GPS Data, received by each of two spaced GPS receivers defines an accurate distance and direction between the two GPS receivers. In one embodiment, two sets of GPS Data, received by two GPS receivers, are translated or converted into latitude and longitude coordinates, or other location defining coordinates. The difference between the two sets of location coordinates, each defining a different location, is mathematically calculated, deriving the distance and direction between the two locations or sites of the GPS receivers. The two sets of GPS Data used are in raw, contaminated state and may be in untranslated or unconverted form or may be in raw, contaminated but translated form. This avoids determining, identifying and/or defining the true or accurate location or site of either GPS receiver; avoids the need for generating error correcting data; and, avoids the need for correcting the inaccuracy in location defined by the GPS Data, as taught in the prior art. The invention is especially useful on a golf course for determining accurate distance and direction between two objects on the golf course, although the invention is not limited to such use.

In accordance with one aspect of the invention, at least two GPS receivers are provided, along with a computer or data processor and at least two transmitting/receiving radios. One GPS receiver is essentially fixed on or at the pin on the green of a hole on a golf course. The exact, defined location of the pin on the green need not be known or determined. A radio is coupled to the GPS receiver at the pin, to transmit GPS Data received by the GPS receiver at the pin. Another GPS receiver is mobile or portable and may be anywhere on the golf course. The computer or data processor is preferably associated with the mobile or portable GPS receiver. Another radio is coupled to the mobile GPS receiver and to the computer for receiving GPS Data transmitted by the radio coupled with the GPS receiver at the pin and for applying such GPS Data to the computer. The mobile GPS receiver is coupled to its associated computer to apply GPS Data received by the mobile GPS receiver to its associated computer. GPS Data from the GPS receiver at the pin and GPS Data from the mobile GPS receiver are transmitted and/or applied to the computer. The computer is programmed at least to mathematically calculate at least two sets of GPS Data to determine the difference between the two sets of GPS Data. With one set of GPS Data, received by one GPS receiver at one location defining a location for the one GPS receiver and a second set of GPS Data, received by another GPS receiver at a second location defining a second location for the other (second) GPS receiver, then, the difference between the two sets of GPS Data defines the distance and direction of such distance between two locations defined by two sets of GPS Data. In the present aspect, the distance and direction determined is the distance and direction between the GPS receiver at the pin and the mobile GPS receiver on the golf course. This is the distance and direction cart-to-pin.

The mobile or portable GPS receiver may be carried across the golf course on a golf cart or in a golf bag of a player or carried by the player. When the player carries the mobile or portable GPS receiver and holds the portable GPS receiver at or over the golf ball on the fairway, the distance and direction derived by the computer is between the golf ball on the fairway and the pin. This is the distance and direction ball-to-pin. The distance and direction may be displayed visually and/or audibly.

In accordance with another aspect of the invention, at least two mobile or portable GPS receivers are provided along with at least one computer or data processor and at least two radios. Each of the GPS receivers may be mounted or carried on golf carts used on the golf course. Each of the GPS receivers may have associated therewith, a computer and each of the GPS receivers has a radio for transmitting and receiving. Each GPS receiver is for receiving GPS Data from satellites in the GPS system. Preferably, one of the GPS receivers, with computer and radio is mounted or carried on a golf cart used by a Golf Course Supervisor, for example. The other GPS receiver may be mounted or carried on a golf cart used by a player on the golf course. A system, interactive between the golf cart of the Golf Course Supervisor and the player golf cart, remotely activates the GPS receiver on the player golf cart, when actuated. The GPS receiver on the player golf cart receives GPS Data which is transmitted by the on-board radio. The radio on board the golf cart of the Golf Course Supervisor receives the GPS Data transmitted from the player golf cart and applies the player GPS Data to the computer on the Golf Course Supervisor golf cart. At the same time, the GPS receiver on the Golf Course Supervisor golf cart receives GPS Data and applies the locally received GPS Data to the on-board computer. The computer mathematically calculates the difference between the two sets of GPS Data and derives therefrom the distance and direction between the Golf Course Supervisor golf cart and the player golf cart, for on-the-course golf cart tracking, leading to golf play control.

Alternatively, a GPS receiver with computer and radio may be located in the club house or pro shop of a golf course.

The GPS receiver located in the club house (or pro-shop) also includes a system for selectively actuating remote GPS receivers. Using known technology, a mobile GPS receiver may be turned on remotely, in response to a coded signal transmitted by a radio, in the club house, for example. Employing a remote actuation system, a selected mobile GPS receiver, mounted on a player golf cart, on the golf course, is remotely activated and the GPS Data received by the selected mobile GPS receiver and the GPS Data received by the GPS receiver in the club house are transmitted and/or applied to the computer associated with the club house GPS receiver, for calculating the distance and direction between the selected player golf cart and the club house. Using a map of the golf course, the location of the selected golf cart may be determined, providing golf cart tracking and/or golf play control from the club house or pro-shop. Golf cart tracking and golf play control are discussed in U.S. Pat. No. 5,324,028, issued to Luna. For golf cart tracking, each golf cart, used on the golf course, may be provided with a GPS receiver and a radio and each golf cart or GPS receiver may be provided with an identifying code. Golf cart tracking may be modified to provide golf player tracking, if desired.

In yet another aspect of the invention, distance and direction between a golf ball on the fairway and the pin on the green (distance ball-to-pin) is measured. When practicing this aspect of the invention, preferably a fixed GPS receiver with radio, and one or more mobile GPS receivers with computer and radio, are provided. The fixed GPS receiver is preferably located on or in the vicinity of the golf course, the exact location of which need not be defined. The mobile GPS receiver may be mounted or carried on a golf cart used by a player on the golf course or may be carried by the player on the golf course. The distance and direction between the pin on the green and the fixed GPS receiver is measured, by conventional means, and is stored in the computer, for later use. The fixed GPS receiver and the mobile GPS receiver each receive respective sets of GPS Data from satellites in the global position system, preferably, at substantially the same real time. The respective sets of raw, contaminated GPS Data are applied to the computer for calculating the difference between the two sets of GPS Data, for deriving the distance and direction between the fixed GPS receiver and the mobile GPS receiver. The distance and the direction between the fixed GPS receiver and the mobile GPS receiver is a derived leg, extending from the fixed GPS receiver to the mobile GPS receiver. The distance and direction between the fixed GPS receiver and the pin, already measured and stored in the computer, is a known leg, extending from the fixed GPS receiver to the pin.

The derived leg and the known leg extend from the same point, the fixed GPS receiver. With the direction of both legs known, the angle between the legs is determined. With distance of both legs and their respective directions known, the leg connecting the extremes of the known leg and the derived leg is calculated, providing the distance and direction between the mobile GPS receiver and the pin. When the mobile GPS receiver is positioned at, near or over the golf ball on the fairway, the calculated leg is the distance and direction between the golf ball and the pin.

Distance and direction between the fixed GPS receiver and the pin, or any object, for example, may be measured by any of several conventional means, for example, a tape measure or any mechanical, optical, electric, electronic and/or sonic distance measuring means or range finder, without the need for defining the location of either the fixed GPS receiver or the object. The term object is intended to represent a pin on a green, or a hazard on the golf course, or the club house or pro shop on the golf course, or any other object on the golf course. When practicing certain aspects of the invention, a GPS receiver may be substituted for, or represent the object, in practicing other aspects of the invention the object retains its own identity. This will be apparent to those reading this disclosure and to those practicing the invention. The distance and direction between the fixed GPS receiver and each of a plurality of objects may be measured and codified. The measurement and ID code for the particular object may be programmed and/or stored in a computer or data processor, for later retrieval and/or use. The mobile GPS receiver may represent each of a plurality of GPS receivers, whether mobile or portable, transported over the golf course on golf carts or by the player, for example. A mobile GPS receiver, with an associated computer, may be mounted on a mobile unit, such as a golf cart, for example, or may be portable and carried on a golf cart or a golf bag or by a person, such as a player, for example. A golf cart may be motor driven, engine driven or manually moved over the golf course. In addition to the fixed GPS receiver and the mobile GPS receiver, which may be stationary when used to practice the invention, the invention provides for a computer or data processor and may include one or more radios, to receive and/or send GPS Data received by GPS receivers, to computers, as discussed above. A read out means, such as a monitor or screen, for example, a cathode ray tube, a light emitting diode screen or a liquid crystal screen, is also provided. A GPS Data converter means may be used, if desired, to convert or translate GPS Data into location coordinates such as latitude and longitude, for example, which define a location.

Preferably the mobile GPS receiver, the computer, the radio and the read out means are mounted on the golf cart, however, corresponding equipment may be transported by the player. The computer may receive GPS Data from a GPS receiver through a solid link, while also receiving other GPS Data from a second GPS receiver, through an air link, such as an RF receiver means, for example. The read out means may be a monitor, printer or other visual readout means and/or may be an audible means.

GPS Data, received from satellites in the GPS system by a GPS receiver, is in radio frequency form and is translatable into angular distances or location coordinates, such as latitude and longitude, for example, which define a location on earth. The difference between two locations, each defined in latitude and longitude, is a latitude value and a longitude value which translate into a distance and direction of that distance. If two different locations, such as the locations of two spaced objects, for example, are defined by sets of latitude and longitude values, the difference between the latitude values of each set and the longitude values of each set is a latitude value and a longitude value which is translatable into a distance and an angle of that distance. If two sets of GPS Data define two locations accurately, with respect to the true locations, the difference between the definitions is the distance and direction between the actual locations. If the two sets of GPS Data define the locations inaccurately, with respect to the true locations, and the inaccuracy is common to each definition, the distance and direction is between two locations equally off-set from the two actual locations and therefore equal and corresponding to the distance and direction between the actual locations. Accurately defined locations are not required so long as the inaccuracy or off-set in the definition, from the true locations is common and corresponding to each set of two location definitions.

In practicing the invention using one or more GPS receivers in fixed locations, and one or more mobile GPS receivers, the GPS receiver in fixed location is preferably operated on a continuing basis, transmitting received GPS Data, relating to the site or location of the particular fixed GPS receiver. The mobile GPS receiver is operated in response to demand. The two sets of GPS Data used, one set of GPS Data defining one location and another set of GPS Data defining another, spaced location, are received coincidentally.

The two sets of GPS Data or the two sets of location coordinates translated from the two sets of GPS Data are mathematically combined, preferably by a computer or data processor programmed for the same. The latitude difference value and/or the longitude difference value may be converted into distance such as meters and centimeters or miles and yardage, for example, and direction. Distance on a golf course, such as distance between the golf cart and the pin or distance between the golf ball on the fairway and the pin are preferably provided in yardage. Direction may be a magnetic direction or true direction.

In an operating system practicing the invention, it is preferred that a fixed GPS receiver receive GPS Data continuously and that the coupled radio transmit the GPS Data instantly and continuously. The mobile GPS receiver and the radio to which it is coupled operate on demand. A fixed GPS receiver and it associated equipment in a club or pro-shop on a golf course would be operated on a demand basis.

DETAILED DESCRIPTION OF THE INVENTION

Figure 1:
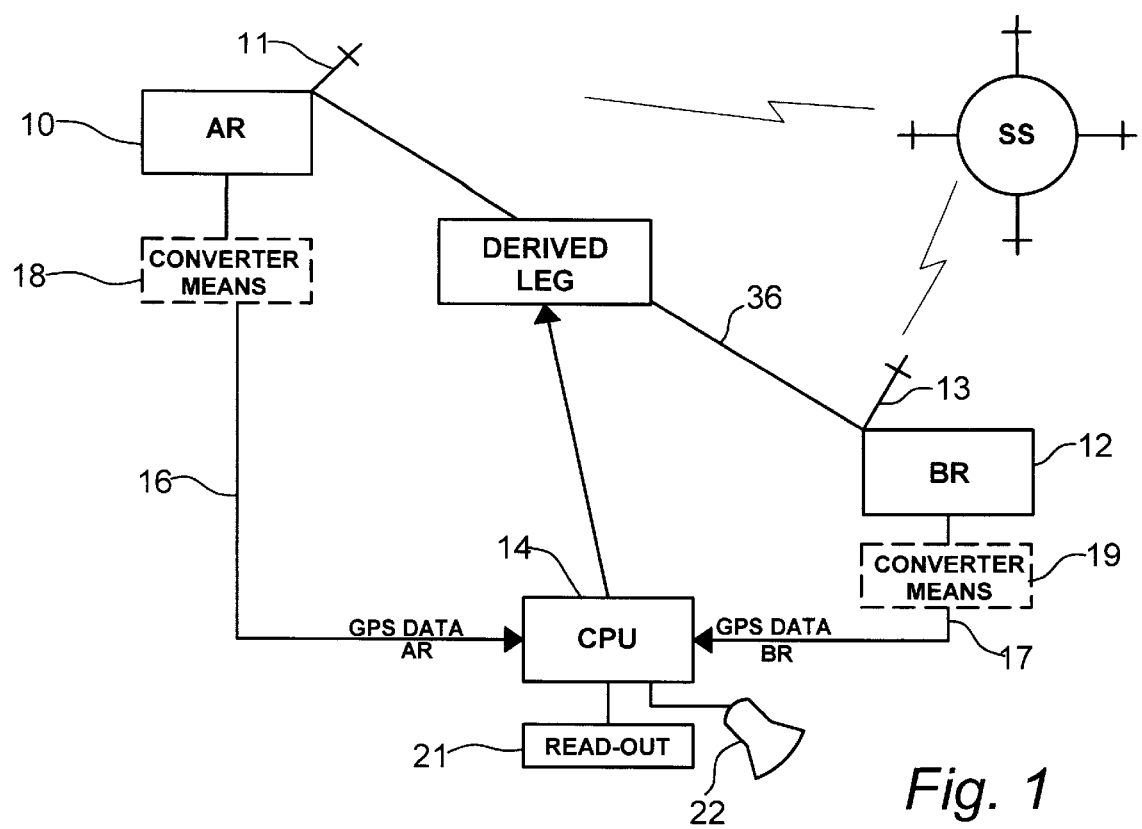
FIG. 1 is a block diagram representing the basic invention.

For convenience and clarity, throughout the drawings identical components are identified with identical call-out numbers and/or letters. FIG. 1, a block diagram, represents a preferred embodiment of the basic invention utilized for measuring the distance and direction between two undefined locations or sites. One or more global position satellites (GPS), in orbit above the earth, are represented at SS. Block 10 represents a global position signal receiver (GPS receiver), AR, with antenna 11. Block 12 represents a GPS receiver, BR, with antenna 13. GPS receiver AR, is spaced from GPS receiver BR, some unknown distance and direction. The location or site of both GPS receivers are undefined.

Each GPS receiver receives transmitted RF carrier signals modulated with time and timing signal data (GPS Data) from one or more satellites in the GPS system. GPS Data is translatable (or convertible) into coordinate data that defines a location, on earth, for the antenna of the GPS receiver receiving the GPS Data. For descriptive purposes, it will be assumed that the term GPS receiver includes the GPS receiver and the antenna. A converter means, for converting GPS Data into coordinate data, may be associated with each GPS receiver to convert the GPS Data received by the GPS receiver into coordinate data, such as latitude and longitude, for example, which defines a location for the GPS receiver receiving the particular GPS Data. Broken line block 18 represents a converter means for GPS receiver AR and broken line block 19 represents a converter means for GPS receiver RR.

Block 14, CPU represents a computer or data processor programmed at least to receive and mathematically combine two sets of GPS Data, for calculating the difference between the two sets of GPS Data. The GPS Data processed by the computer is raw, contaminated GPS Data which may be unconverted data, translatable into coordinate data or may be converted or translated data, translated into coordinate data. A GPS receiver with a converter means is available on the open market and may be modified for use in practicing the invention.

For the purpose of describing this invention, it will be assumed that converter means 18 and 19 are used in association with the GPS receivers AR and BR, respectively. Thus, the line or link 16 carries converted data, represented by GPS DATA AR, defining a location for the GPS receiver, AR, in latitude and longitude coordinates, to the computer, CPU. The line 17 carries converted data, represented by GPS DATA BR, defining a location for the GPS receiver, BR, in latitude and longitude coordinates, to the computer CPU.

Block 14, CPU, represents a computer or data processor programmed at least to receive and mathematically combine two sets of GPS Data, in unconverted form or in converted form, such as GPS DATA AR and GPS DATA BR, for example, for calculating the difference between the two sets of GPS Data, for deriving the distance and direction between the two locations defined by the two sets of GPS Data. The line 16 represents a communication link and/or interface between GPS receiver AR and the computer, CPU through which GPS Data is transmitted to the computer. Line 17 represents a communication link and/or interface between GPS receiver BR and the computer CPU through which GPS Data is transmitted to the computer CPU. The communication link 16 and/or 17 may be an air link or a solid link. The computer or data processor CPU, includes a read out 15 which may be visual, such as a monitor or a print out, for example, and/or may be audible, such as represented by the speaker 15a.

With GPS Data converted into corresponding latitude and longitude coordinates, the computer or data processor, CPU, may be programmed at least to receive and to mathematically combine two sets of location coordinates, such as one set of latitude and longitude values with another set of latitude and longitude values, for example, each set of location coordinates defining a different location, to calculate the difference between the two sets of location coordinates and to derive a distance and a direction between the two locations defined by the two sets of location coordinates.

Figure 2B:
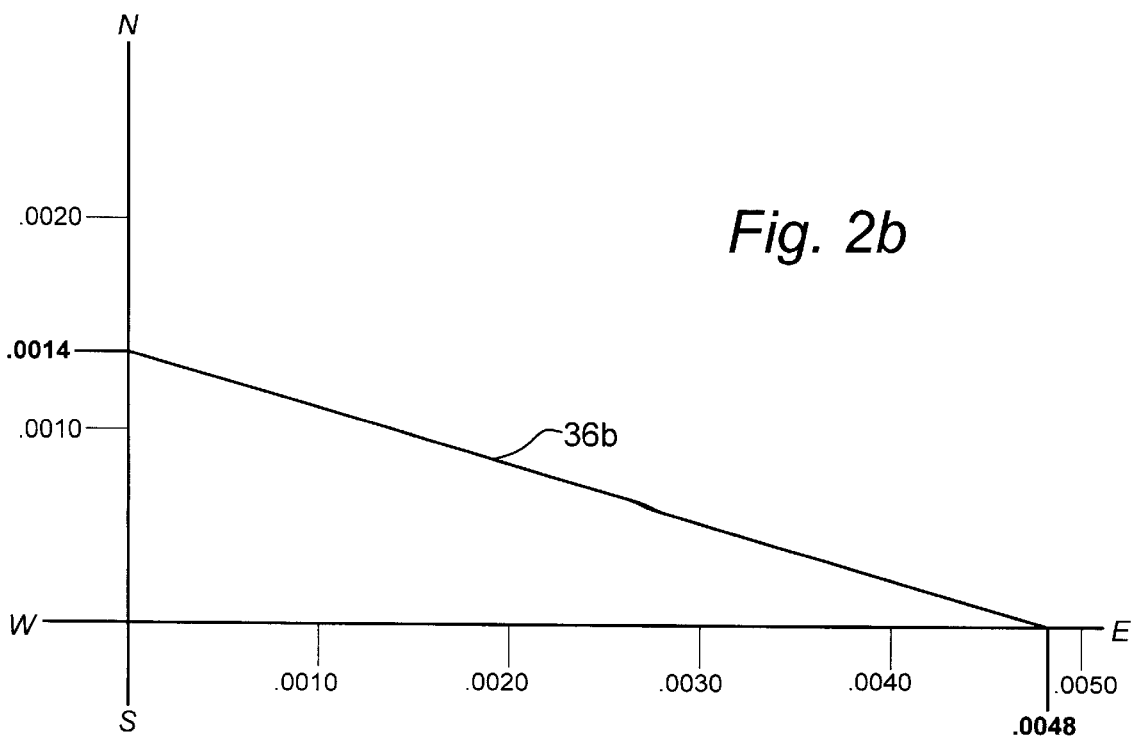
FIG. 2b represents location coordinate differences charted in vector form to derive distance and direction.
Figures 2, 2A:
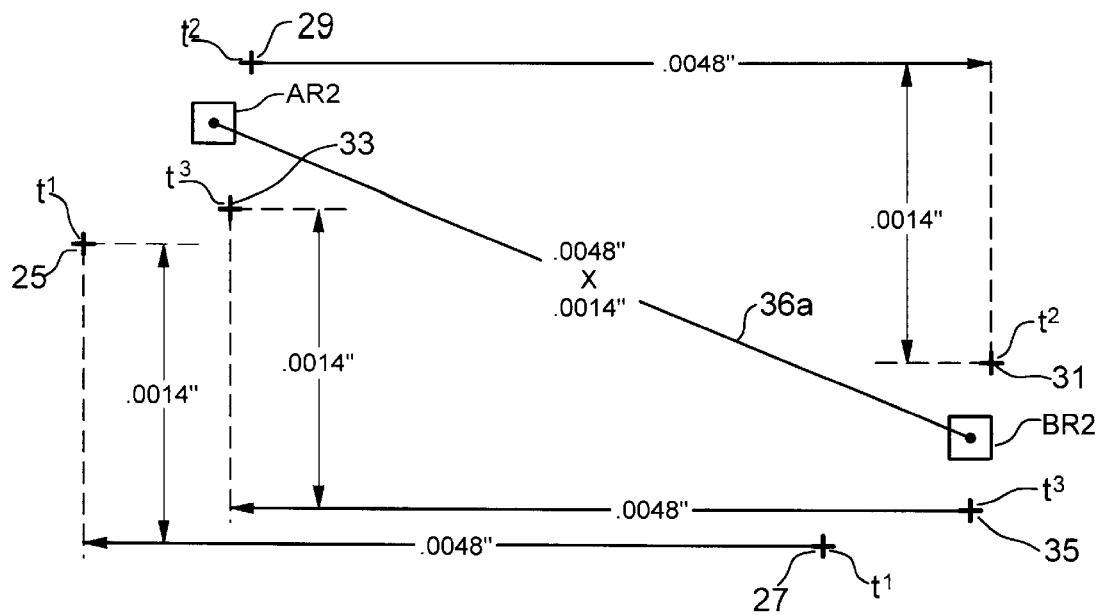
FIG. 2 represents location defining coordinates and coordinate differences which may be obtained practicing the invention represented in FIG. 1.
FIG. 2a represents a graphic form for calculating and deriving distance and direction when practicing the invention.

Attention is directed to FIG. 2, which represents sets of latitude and longitude location coordinates in two columns, A and B. The location coordinate sets in column A represent location coordinates received at real time t1, t2 and t3 by a first GPS receiver. The location coordinate sets in column B represent location coordinates received at the same clock time, t1, t2 and t3, by a second GPS receiver. With GPS Data translated or converted into latitude and longitude values, location is defined in an east/west distance from the Greenwich meridian and a north/south distance from the Equator meridian, respectively. Other forms of location defining coordinates may be used, if desired.

The latitude and longitude values in column A and in column B are examples of latitude and longitude values that may be translated from GPS Data received by GPS receivers positioned at locations AR2 and BR2, for example, in FIG. 2a.

Let it be assumed that the three sets of location coordinates in column A of FIG. 2 represent the GPS DATA AR, latitude and longitude values, received at clock times t1, t2 and t3, respectively, by the GPS receiver AR and that the GPS receiver, AR, in FIG. 1, corresponds to a GPS receiver AR2, represented in FIG. 2a. Further, that the three sets of location coordinates in column B of FIG. 2 represent the GPS DATA BR, latitude and longitude values, received at the same clock time, t1, t2 and t3, respectively by the GPS receiver BR and, that the GPS receiver, BR, in FIG. 1, corresponds to a GPS receiver BR2 represented in FIG. 2a.

The longitude value following W represents a distance, in units of degrees, minutes and seconds, west of the Greenwich meridian, and the latitude value following N represents a distance, in units of degrees, minutes and seconds, north of the Equator meridian. The distances defined by each degree, each minute and each second and/or part thereof are well established. The latitude value in column A, received at time t1, is mathematically combined with the latitude value in column B, received at time t1 to calculate a difference latitude value, time t1, column D. The longitude value in column A, received at time t1, is mathematically combined with the longitude value in column B, received at time t1 to calculate a difference longitude value, time t1, column D. The difference latitude value is translated into a distance in the north/south direction and the difference longitude value is translated into a distance in the east/west direction.

Considering FIGS. 1, 2 and 2a, at time t1, GPS receiver AR in FIG. 1 (AR2 in FIG. 2a) receives GPS Data from satellites SS, in the GPS system. The GPS Data received by the GPS receiver AR is converted into GPS DATA AR, which translates into

W 80 18' 41.7781"×N 26 05' 22.5491".

Plotting the location coordinates in column A, FIG. 2 received at time t1, in FIG. 2a, the location is represented at 25, for example. At the same time, t1, GPS receiver BR in FIG. 1 (BR2 in FIG. 2a) receives GPS Data from satellites SS in the GPS system. The GPS Data received by the GPS receiver BR is converted into GPS DATA BR, which translates into

W 80 18' 41.7733"×N 26 05' 22.5477".

Plotting the location coordinates in column B, FIG. 2 received at time t1, in FIG. 2a, the location is represented at 27, for example. The difference between the time t1 location coordinates, that is, the latitude and longitude values in the column A and in the column B is

W 0.0048"×N 0.0014".

The value 0.0048" is translatable into a distance, i.e., 48 ten thousands of a navigational second, in an east-west direction and 0.0014" is translatable into a distance, i.e., 14 ten thousands of a navigational second, in a north-south direction.

FIG. 2 represents three sets of translated latitude and longitude coordinate values for each of the two locations, AR2 (column A) and BR2 (column B) taken at three different clock times t1, t2 and t3. Column D represents the latitude and longitude difference values that translate into distance and direction between the two locations AR2 and BR2, for example. FIG. 2a represents, in graphic form, the latitude and longitude coordinate values in columns A and B of FIG. 2, with the latitude and longitude difference values represented in column D, also shown in FIG. 2a. The line 36 in FIG. 1 represents the distance and direction between the locations AR and BR. Line 36a, FIG. 2a, corresponds to line 36 in FIG. 1.

As represented in FIG. 2a, the locations defined by the GPS Data received by the respective GPS receivers are offset or inaccurate, with respect to true location, but, as previously discussed, it will be found that the inaccuracies in the locations defined by the contaminated GPS satellite transmissions, transmitted at the same time, are identical. The line 36b, FIG. 2b, represents the latitude and longitude difference values represented in column D of FIG. 2, plotted in vector form, on the vertical axis, NS, north/south, and the horizontal axis, EW, east/west. The latitude and longitude difference values in column D, represent navigational distances in terms of seconds and define a north/south distance of 0.0014 seconds distance, for example, and an east/west distance of 0.0048 seconds distance, for example.

Since the distance of a navigational second is known in meters and centimeters, the distance of 0.0014 navigational seconds, and/or 0.0048 navigational seconds, for example, may be translated into meters and centimeters or, may be converted into yardage, if desired. Thus, the distance between the two locations, such as AR2 and BR2, for example, may be converted into and expressed in yardage, if desired.

The latitude and longitude location coordinate values in column A and in column B of FIG. 2, received at the same time, t2, define locations represented at point 29 and point 31, respectively, in FIG. 2a. The location coordinates in column A and in column B of FIG. 2, received at time t3, define locations represented at points 33 and 35, respectively, in FIG. 2a. It will be found that when GPS Data is received by each of two spaced GPS receivers, at the same clock time, the difference between the two sets of GPS Data defines the distance and direction between the two spaced GPS receivers. The line 36 in FIG. 1 and 36a in FIG. 2a, represent the distance between the two locations of the GPS receivers, AR2 and BR2 (FIG. 2a), for example, which distance is derived from the difference between two sets of GPS Data received at the same clock time, by two GPS receivers, positioned at the two locations. This is a Derived Leg. The line 36b in FIG. 2b represents the difference between the two sets of GPS Data, in vector form, translated into a scale of latitude and longitude distances. With the present system the need to define true or correct locations is obviated.

Referring to FIG. 1, the GPS receiver AR and the GPS receiver BR, for example, may be positioned in any spaced locations and the distance and direction between the two locations of the GPS receivers, are mathematically calculated. When practicing the invention the GPS receivers may be stationary or may be in motion.

If a GPS receiver is traveling, continuous adjustments may be made in the location of the traveling GPS receiver. Travel of a mobile GPS receiver on a golf cart, for example, may be detected by sensing the rotation of the wheels, as is well known. The derived distance may be adjusted in both distance and direction of travel.

On a golf course, for example, a GPS receiver, or the antenna thereof, may be mounted or attached to the pole received in the pin on the green and a mobile GPS receiver may be carried on a golf cart used on the golf course, or may be portable and carried along the golf course. With related computer equipment on the golf cart, the Derived Leg provided by the invention is the distance, cart-to-pin. If the mobile GPS receiver is portable and is held over a golf ball on the fairway by the player, the distance is ball-to-pin. With a GPS receiver on a golf cart operated by a Supervisor of Golf Play and GPS receivers on player golf carts, the Supervisor of Golf Play may selectively actuate a GPS receiver on a player golf cart and the invention will provide the Supervisor of Golf Play with the distance and direction of a player golf cart from the golf cart of the Supervisor of Golf Play. The player golf cart may be located on the golf course using a map thereof and the speed of play of players on the golf course may be determined and/or controlled.

Figure 3:
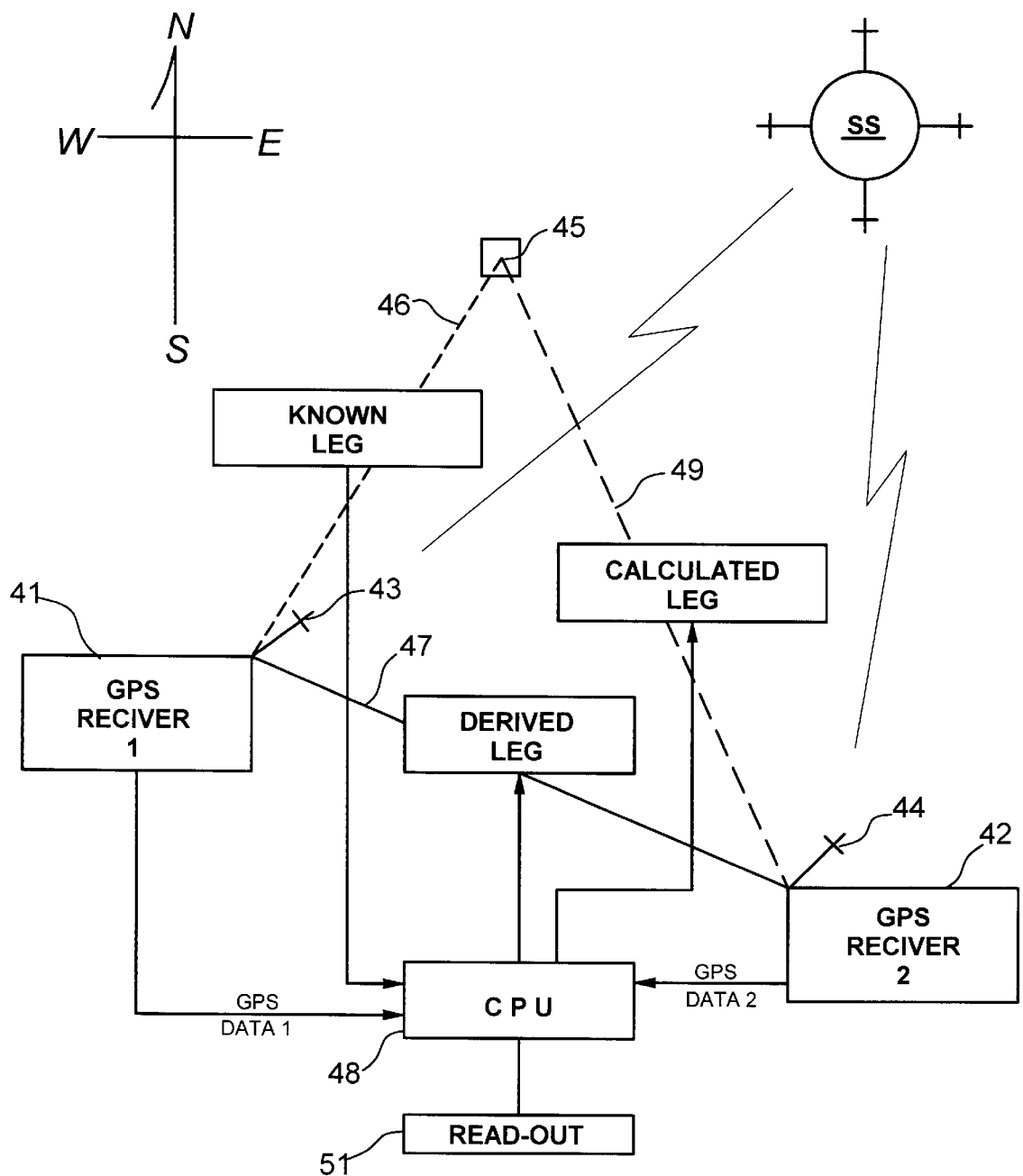
FIG. 3 is a block diagram representing another aspect of the invention.

FIG. 3 is a block diagram representing a system practicing the invention described herein, employing a fixed GPS receiver, block 41, GPS RECEIVER 1 and a mobile GPS receiver, block 42, GPS RECEIVER 2. The objective of the system is to accurately measure the distance and direction between the GPS RECEIVER B and an object, 45, using GPS satellites contaminated transmissions, with the exact locations of both GPS receivers, 1 and 2, and the object, 45, undefined. The system uses GPS Data received from the GPS satellite system for calculating the distance and direction between the two GPS receivers, 1 and 2, as describe above.

The distance and direction between the object 45 and the fixed GPS RECEIVER 1 is measured using conventional distance and direction measuring means, without the necessity of defining the exact location of either the GPS receiver A or defining the exact location of object 45. The object 45 may be a pin on the green or a hazard or any other object on the golf course, for example. The distance and direction between the fixed GPS RECEIVER 1 and the object 45 may be measured at any convenient time by conventional distance measuring means, such as tape measure, optical sight, micro wave or any other distance measuring or range finding means, for example. Direction may be a compass or true north direction. The distance and direction of the Known Leg 46 are stored in a computer or data processor 48, CPU. The GPS RECEIVER 1 and the GPS RECEIVER 2, receive GPS Data from satellites SS in the GPS system and apply GPS DATA 1 and GPS DATA 2 to the computer 48. Distance and direction between GPS RECEIVER 1 and GPS RECEIVER 2 is derived from calculations with GPS DATA 1 and GPS DATA 2, as previously discussed. The Derived Leg, 47, is between GPS RECEIVER 1 and GPS RECEIVER 2.

The distance and direction of each of two legs, 46 and 47, are stored in the computer, block 48, CPU. With the distance and direction of each leg known and extending from a common point, the angle formed by the two legs is calculated. With these known factors, the distance of the leg 49, between the extremes of the legs 46 and 47, is calculated. This is the Calculated Leg. Thus the distance and direction between the object 45 and the GPS RECEIVER 2, is calculated by the computer. The read-out 51 displays the distance of the calculated leg 49.

Figure 3A:
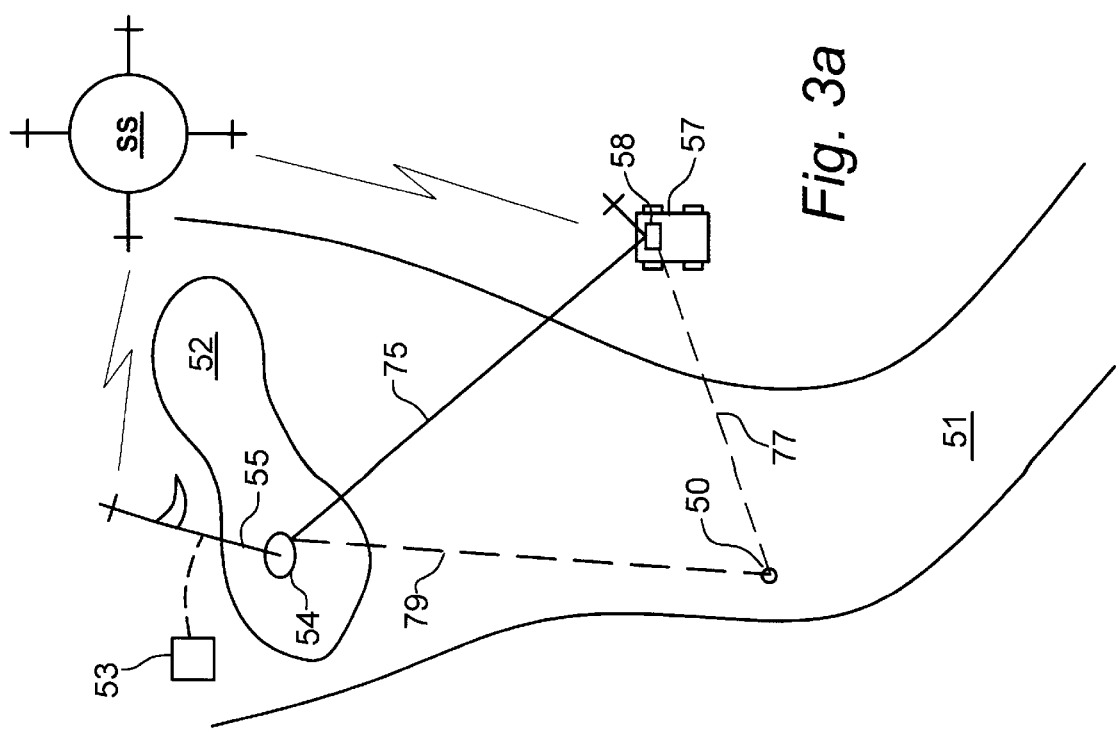
FIG. 3a is a representation of the invention represented in FIG. 3 practiced on a golf course.

FIG. 3a is a graphic representation of part of a golf course on which the invention, represented in FIG. 3, is practiced. A fairway 51 of a golf course with a green 52, pin 54 and flag pole 55, received in the pin 54 are represented. A golf cart 57 with a GPS receiver, 58, mounted thereon stands off the fairway.

Figure 5:
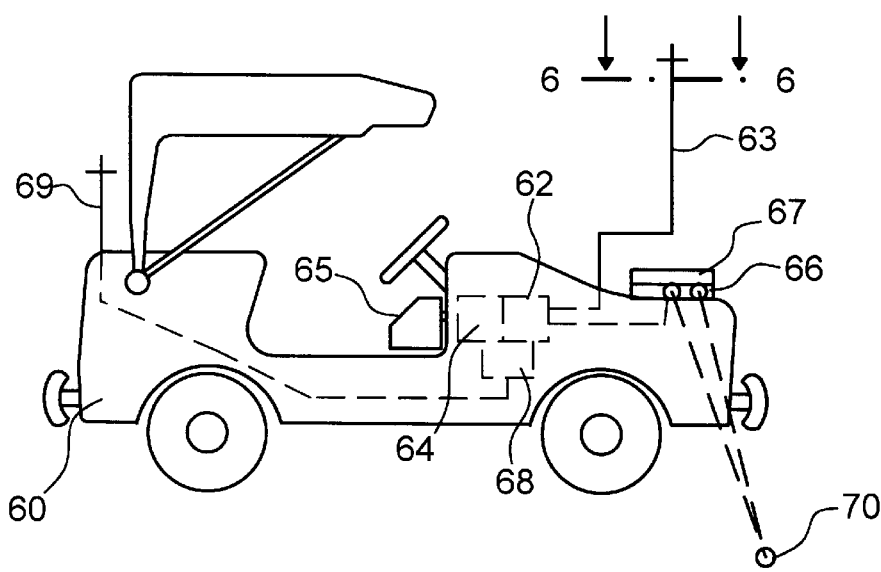
FIG. 5 is a representation of a golf cart with apparatus mounted thereon for practicing the invention.
Figure 6:
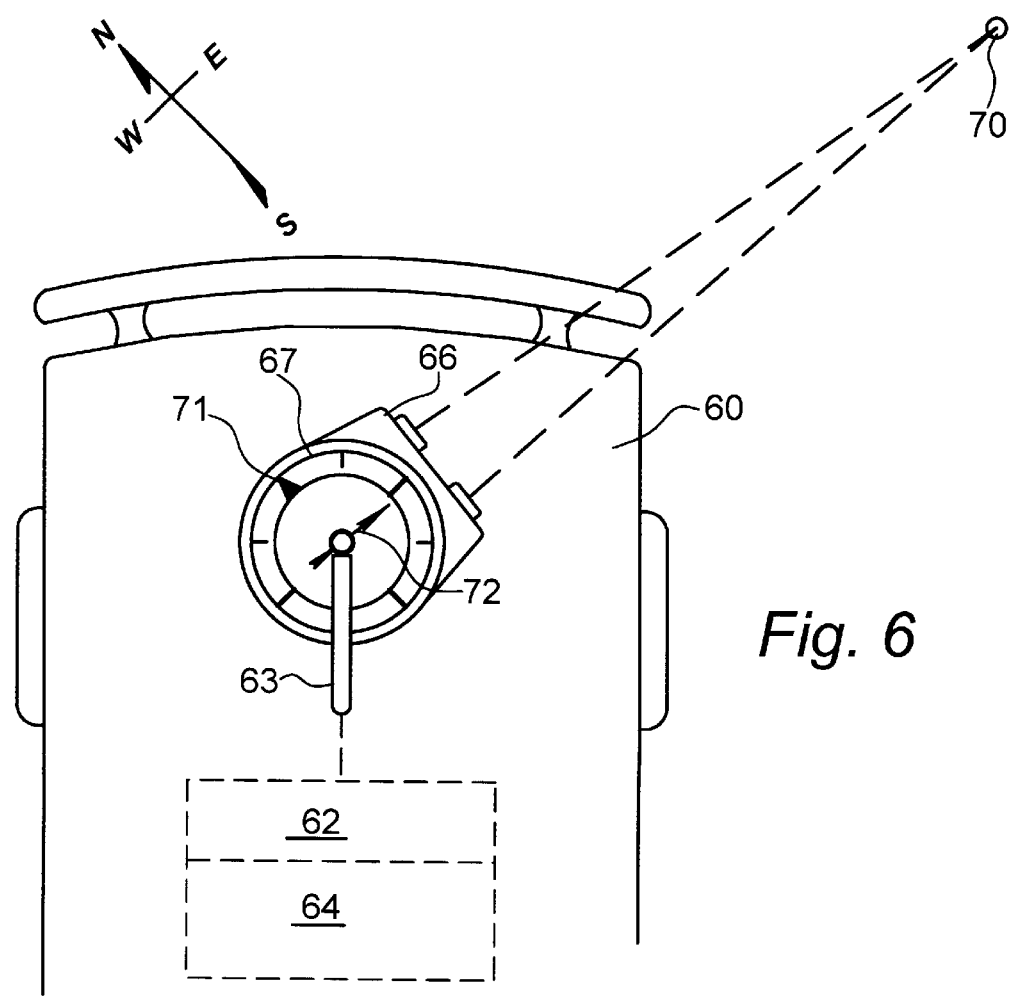
FIG. 6 is a representation of a portion of FIG. 6 along line 6—6.

Referring to FIGS. 5 and 6. FIG. 5 a mobile GPS receiver 62 with antenna 63 is represented mounted on a golf cart 60. A computer or data processor, 64 with monitor 65, is connected to the GPS receiver 62. A radio 68, with antenna 69, is connected to the GPS receiver, 62 and to the computer, 64. FIG. 6 is a top graphic view of the golf cart 60, FIG. 5, along lines 6—6. Mounted on the golf cart are a range finder 66 and direction finder 67. Preferably the range finder and direction finder are mounted so that a center axis passing through the apparatus is co-axial with an axis passing through the antenna 63. The range finder 66 and direction finder 67 are operated by a person using the golf cart. Distance between the GPS receiver 62, at antenna 63, and a golf ball 70, on the airway, is measured by the distance measuring means 66. The distance measurement is applied to the computer 64. Direction of the ball 70 from the GPS receiver, at antenna 63, is measured by the direction finder 67. The direction finder includes a compass 71, that tracks magnetic north, and a pointer 72. When the pointer 72 is pointed at the ball, the angle between the pointer and the compass head 71 is the angle, from magnetic north, of the distance between the GPS receiver 62 and the ball 70 on the fairway. The distance measuring means maybe any conventional range or distance finding or indication device, as previously discussed. The range finder and direction finder are connected to the computer so that distance and direction data between the golf ball and the GPS receiver, essentially the antenna, may be applied to the computer. The distance and direction data correspond to a Measured Leg. It should be understood that distance and/or direction measured from a GPS receiver, is measured from the antenna of the GPS receiver.

The golf cart 60 also has mounted thereon a radio 68 with antenna 69 for transmitting and receiving data to and from other GPS receivers in the system. The radio 68 is coupled to the on-board GPS receiver for transmitting GPS Data received by the on-board GPS receiver to GPS receivers in the system via their respective radios. Radio 68 is also coupled to the on-board computer 64 for transmitting to the on-board computer GPS Data received by the radio from other GPS receivers in the system.

Returning to FIG. 3a, the golf cart 57 corresponds to the golf cart 60 in FIGS. 5 and 6 and includes a GPS receiver with antenna, a range finder, a direction finder, a computer, a radio and a monitor or read-out means.

A GPS receiver 53 is mounted on or connected to the pole 55 so that the antenna of the GPS receiver is co-axial with the axis of the pole 55. The GPS receiver 53 also includes a radio (not shown) for transmitting GPS Data received by the GPS receiver 53 to radios on golf carts, for example. GPS Data is received from the satellites SS by the GPS receiver 58 on the golf cart and by the GPS receiver 53 at the pin-pole 55. The pole 55 is normally received in the pin 54 on the green 52 so that the GPS Data received by GPS receiver 53 relates to the pin 54.

The sets of GPS Data received by the GPS receiver 53 and the GPS receiver 58, respectively, are applied to the computer on-board the golf cart 57. The computer derives the distance and direction between the GPS receiver 58 and the pin 54, leg 75 from calculations with the two sets of GPS Data This is the distance, cart-to-pin. The range finder and the direction finder on the golf cart 57 are operated and the distance and direction between the GPS receiver 58 and the golf ball 50, on the fairway, is measured, leg 77. The distance and direction of both legs are applied to the computer on-board the golf cart. With the distance and direction of both legs 75 and 77 extending from a common point, the distance and direction between the extremes of the legs 75 and 77 is calculated, leg 79. This is the distance, ball-to-pin.

Although the GPS receiver 53 or its antenna is represented mounted at or on the pole 55, the GPS receiver, or the antenna thereof, may be mounted at or on any object or hazard on the golf course and distance and direction between a mobile GPS receiver, which may effectively be the golf cart, or the golf ball on the fairway and the object on the golf course, may be measured.

Figure 4A:
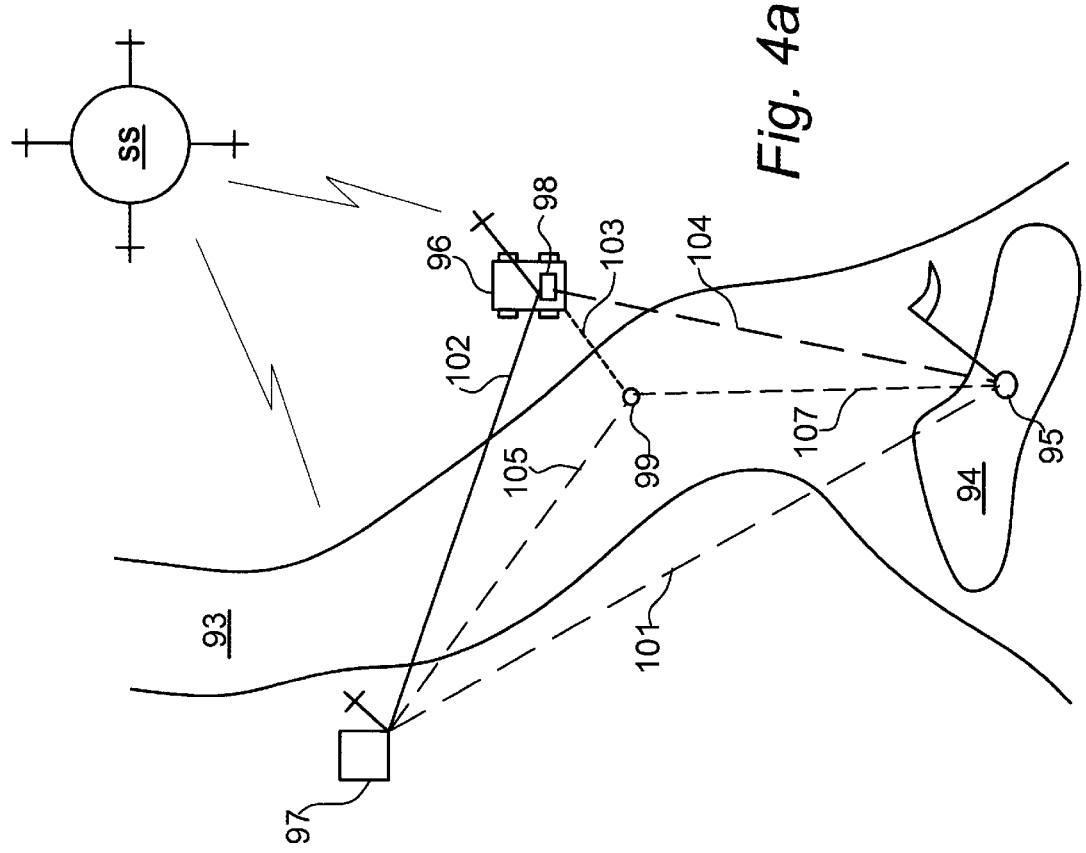
FIG. 4a is a representation of the invention represented in FIG. 4 practiced on a golf course.
Figure 4:
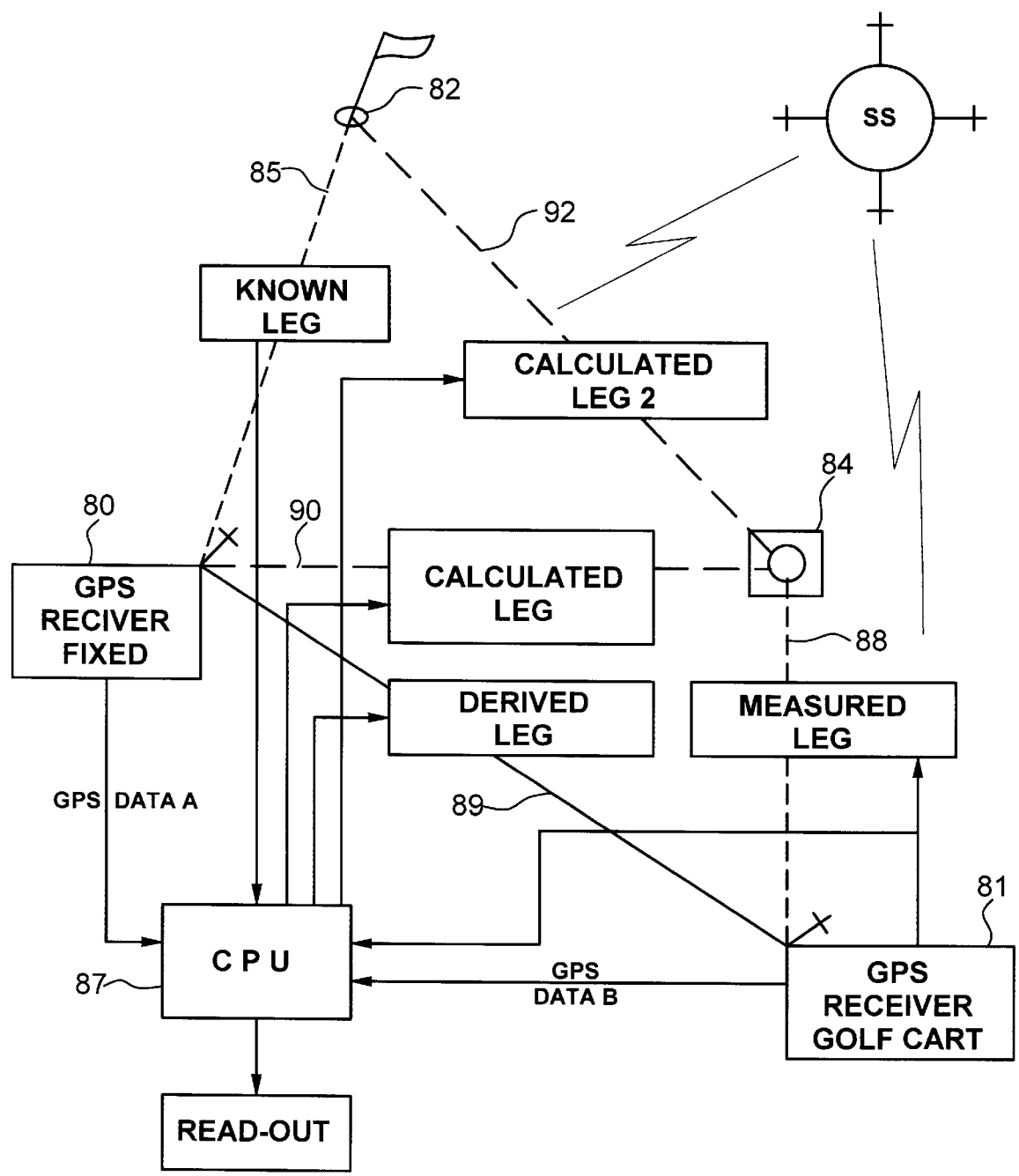
FIG. 4 is a block diagram representing still another aspect of the invention.

FIG. 4, represents, in block form, another aspect of the invention, having utility on a golf course. Block 80 represents a fixed GPS receiver, positioned in fixed location on or in the vicinity of a golf course. The fixed GPS receiver includes a transmitting means, such as a radio, for example, for transmitting GPS Data received by the fixed GPS receiver to mobile units in the system. Block 81 represents a mobile GPS receiver, on a golf cart, for example, such as represented in FIGS. 5 and 6, with peripheral apparatus. The object 82 represents a pin on a green and block 84 represents a golf ball on the fairway. Without defining the exact location of the pin 82 or the exact location of the fixed GPS receiver 80, the distance and direction between the pin and the fixed GPS receiver is measured. Measurement may be accomplished using conventional measuring means, as described above. This is leg 85, Known Leg. The length or distance and direction of leg 85 is stored in the computer, block 87, for later retrieval and use. The distance and direction between the golf ball 84 and the mobile GPS receiver or the golf cart 81 is measured using the distance and direction finding means on the golf cart, as described above. This is leg 88, Measured Leg. The distance and direction of leg 88 is stored in the computer 87. The fixed GPS receiver, block 80 and the mobile or golf cart GPS receiver, block 81 each receive GPS Data for the satellites SS and each GPS receiver transmits GPS Data to the computer, CPU, 87. This is represented as GPS DATA A and GPS DATA B. The computer derives the distance and direction between the fixed GPS receiver 80 and the mobile GPS receiver 81 from calculations with GPS DATA A and GPS DATA B. The leg 89 is a Derived Leg. Using the distance and direction of Measured Leg, 88 and Derived Leg 89, the computer calculates leg 90, Calculated Leg, between the fixed GPS receiver 80 and the golf ball 84. Using the distance and direction of Known Leg, 85 and Calculated Leg 90, Calculated Leg 2, leg 92, is calculated by the computer. This is the distance, ball-to-pin.

The invention represented in block diagram form, in FIG. 4 is represented in graphic form in FIG. 4a. A hole on a golf course is represented with a fairway 93, a green 94 and pin 95. A fixed GPS receiver 97 and a golf cart 96 with a GPS receiver 98 are represented along with a golf ball 99 on the fairway. The golf cart 96, in FIG. 4a, corresponds to golf cart 60 in FIGS. 5 and 6. GPS receiver 98, represented in FIG. 4a, corresponds to GPS receiver 62 in FIGS. 5 and 6. The golf cart 96 also includes a computer, a monitor, distance and direction finders and a radio, such as represented in FIGS. 5 and 6.

The distance and direction between the fixed GPS receiver 97 and the pin 95, leg 101, are measured by conventional distance and direction measuring means, at some convenient time, and are stored in the computer associated with GPS receiver 98, for later retrieval and use. GPS Data is received by each of the GPS receivers 97 and 98 from the satellites SS in the GPS system, at substantially the same time. The two sets of GPS Data received by the respective GPS receivers, are transmitted to the computer on board the golf cart 96. The computer, using the two sets of GPS Data calculates the distance and direction between the two GPS receivers 97 and 98, deriving the leg 102. The leg 103, between the GPS receiver 89 and the golf ball 99, is measured in both distance and direction by the distance and direction finding apparatus on the golf cart 96 and is stored in the computer on board the golf cart 96. With the distance and direction of the leg 102, between the GPS receiver 98 and GPS receiver 97, and the leg 103, between the GPS receiver 96 and the golf ball 99, known, the leg 105, between the ball 99 and the GPS receiver 97 is calculated. With both legs 101 and 105 known, the leg 107, between the ball and the pin is calculated, for the distance, ball-to-pin. If needed, the distance and direction of leg 104, between the GPS receiver 98 and the pin 95 may be calculated since the distance and direction of both legs 101 and 102 are known.

Figure 7:
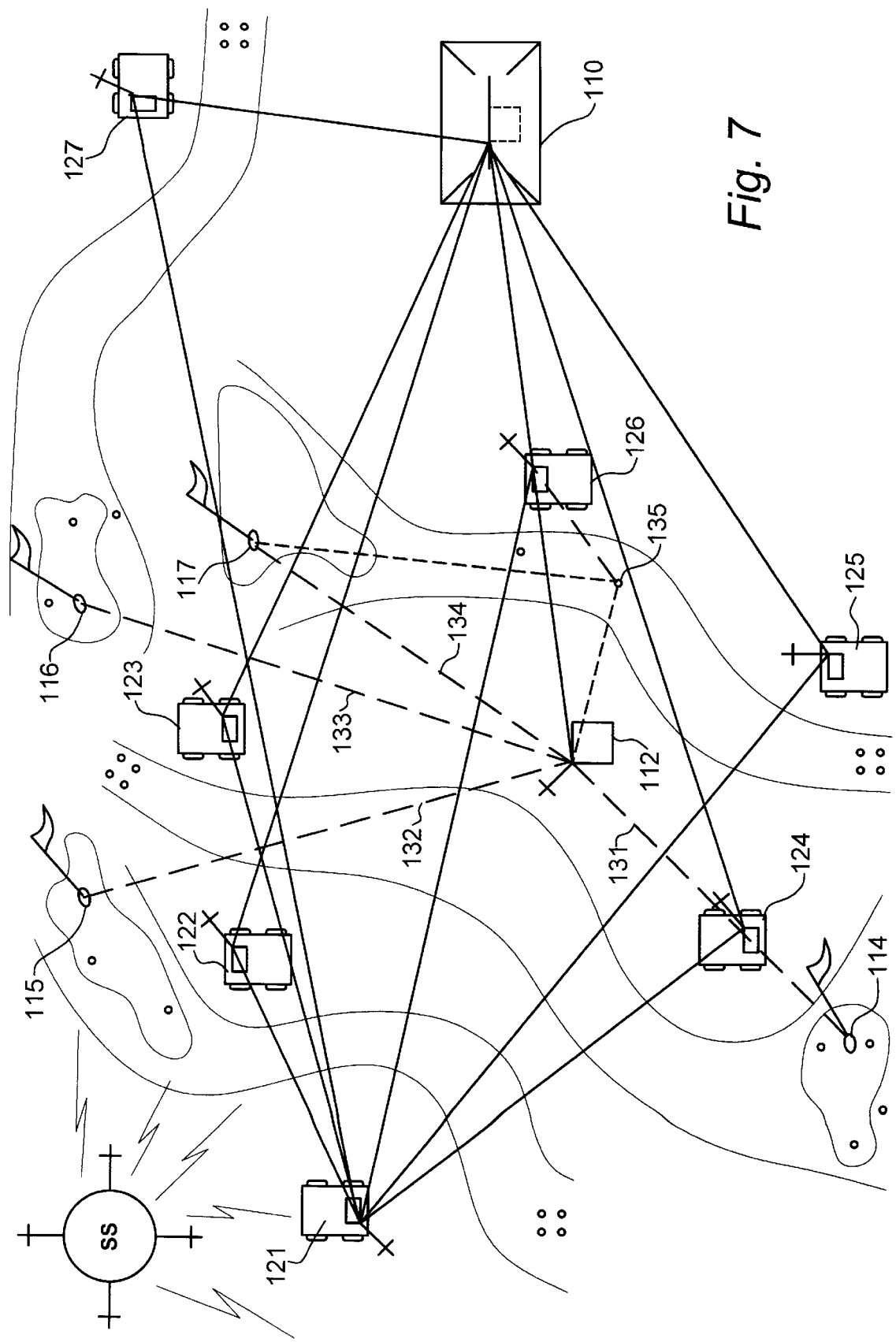
FIG. 7 is a representation of part of a golf course, with several holes with equipment and apparatus represented for practicing several aspects of the invention.

FIG. 7 represents several holes of a golf course, with a club house or pro-shop 110. A fixed GPS receiver 112 is located on the golf course. The distance and direction between the fixed GPS receiver 112 and each of the pins 114, 115, 116 and 117 are measured using conventional measuring and direction finding means and each distance and direction is stored in each computer associated with a GPS receiver. Each of the golf carts 121, 122, 123, 124, 125, 126 and 127 on the golf course correspond to the golf cart 60 in FIGS. 5 and 6 and each includes a computer, a monitor, a distance and direction finding means and radio. The distance and direction of each of the pre-measured legs 131, 132, 133 and 134 are stored in each computer in the system, with an identifying code, for later retrieval and use. The apparatus on-board each golf cart is capable of on-board actuation and operation and remote actuation and operation and includes apparatus for remote activation and operation, which is state of the art technology. The golf cart 121 represents a golf cart used by the Supervisor of Golf Play, for example, and may remotely actuate the apparatus on-board a selected player golf cart so the distance and direction between the golf cart 121 and any other golf cart on the golf course, may be derived. It is assumed that the Supervisor of Golf Play knows where he is, on the golf course and, with the distance and direction between the golf cart 121 and other golf carts on the golf course, the Supervisor of Golf Play can determine the location of a golf cart and determine and/or monitor the speed of golf play on the golf course. The speed of golf play can also be monitored by placing a GPS receiver and associated equipment, in the club house or pro-shop, 110.

The GPS receiver and associated equipment on-board any golf cart, such as 126, for example, may be operated in cooperation with the fixed GPS receiver 112 to calculate the distance between the ball 135 and the pin 117, for example, as described with reference to FIG. 4a.

In the foregoing descriptions of the invention, referenced to the drawings, certain terms have been used for conciseness, clarity and comprehension. However, no unnecessary limitations are implied from or because of the terms used, beyond the requirements of the prior art, because such terms are used for descriptive purposes and are intended to be broadly construed. Furthermore, the description and illustrations of the invention are by way of example, and the scope of the invention is not limited to the exact details shown, represented or described herein.

Having now described a preferred embodiment of the invention, in terms of features, discoveries and principles, along with certain alternative construction and use, other changes and/or use that will become apparent to those skilled in the art, may be made, without departing from the scope of the invention as defined in the appended claims.

What is claimed is:

1. A method for measuring a distance and a direction between a golf ball positioned on a golf course and a pin on a green of a hole of said golf course in which the locations of both said golf ball and said pin on said green are undefined, comprising the steps of:
   a) positioning a first receiver means on or in the vicinity of said golf course;
   b) measuring a first distance and a first direction between said pin on said green and said first receiver means, without defining a location for said pin;
   c) positioning a second receiver means on or in the vicinity of said golf course;
   d) measuring a second distance and second direction between said golf ball and said second receiver means, without defining a location for said golf ball;
   e) operating said first receiver means for receiving a first global position signal data transmitted from navigation satellites translatable into a first location for said first receiver means;
   f) operating said second receiver means for receiving a second global position signal data transmitted from said navigation satellites translatable into a second location for said second receiver means;
   g) calculating said first global position signal data and said second global position signal data for deriving a third distance and a third direction of said third distance;
   h) mathematically combining said second distance and said second direction with said third distance and said third direction for calculating a fourth distance and fourth direction between said first receiver means and said golf ball;
   i) mathematically combining said first distance and said first direction with said fourth distance and said fourth direction for calculating a fifth distance and fifth direction between said pin and said golf ball.

2. A method for measuring a distance and a direction as in claim 1 and further including the steps of:
   displaying at least said fifth distance visually.

3. A method for measuring a distance and a direction as in claim 1 and further including the steps of:
   displaying at least said fifth distance audibly.

4. A method for measuring a distance and a direction as in claim 1 and further including the steps of:
   displaying said fifth distance as distance between said pin and said golf ball.

5. A method for measuring the distance and direction as in claim 4 wherein said fifth distance is displayed in yardage.

6. A system for measuring a distance between a golf ball on a fairway of a golf course and a pin on a green of a hole on said golf course, wherein a first distance and a first direction between said pin and a fixed location on or in the vicinity of said golf course is known, without defining the location of said pin, said system comprising:
   a) a first receiver means for receiving a first global position data transmitted from global position satellites, in orbit above the earth, said first global position data translatable into a first location for said first receiver means, said first receiver means located at said fixed location;
   b) a second receiver means located on or in the vicinity of said golf course and spaced from said first receiver means, said second receiver means for receiving a second global position data transmitted from said global position satellites, said second global position data translatable into a second location for said second receiver means;
   c) a measuring means for measuring a second distance and a second direction between said second receiver means and said golf ball on said airway of said golf course;
   d) a first calculator means for receiving and calculating said first global position data and said second global position data for deriving a third distance and a third direction of said third distance;
   e) a second calculator means for receiving and calculating said first distance and said first direction with said third distance and said third direction for deriving a fourth distance and a fourth direction between said first receiver means and said golf ball; and,
   f) a third calculator means for receiving and calculating said first distance and said first direction with said fourth distance and said fourth direction for deriving a fifth distance between said pin on said green and said golf ball.

7. A system for measuring a distance as in claim 6 and in which said third calculator means derives a fifth distance and a fifth direction between said pin and said golf ball.

8. A system measuring a distance as in claim 6 and further including:
   a) a display means for displaying at least said fifth distance between said golf ball and said pin.

9. A system for measuring a distance as in claim 6 and further including:
   a) a first converter means for converting said first global position data into a first location coordinate data;
   b) a second converter means for converting said second global position data into a second location coordinate data; and,
   c) said first calculator means receives said first location coordinate data and said second location coordinate data for calculating said third distance and said third direction.

10. A system for measuring distance as in claim 6 wherein said first receiver means is in fixed position and said second receiver means is mobile.

11. Apparatus for measuring a distance between a golf ball on a golf course and an object on said golf course, comprising:
   a) a first GPS receiver means located on or in the vicinity of a golf course, said first GPS receiver means for receiving a first global position data transmission from one or more global position satellites, in orbit above the earth, said first global position data defining a first location for said first GPS receiver means, said first GPS receiver means spaced from an object on said golf course a first measured distance and a first measured direction said first measured distance and said first measured direction measured without defining a location for said object;
   b) a second GPS receiver means for receiving second global position data transmitted from one or more global position satellites, said second global position data defining a second location for said second GPS receiver means, said second GPS receiver means being mobile and transported along said golf course;

c) a measuring means for measuring a second distance and a second direction between said second GPS receiver means and a golf ball on said golf course;

d) a first data processor means for receiving said first global position data from said first GPS receiver means and said second global position data from said second GPS receiver means for calculating a third distance and a third direction of said third distance;

e) a second data processor means for receiving said second distance and said second direction and said third distance and said third direction for calculating a fourth distance and a fourth direction between said first GPS receiver means and said golf ball; and f) a third data processor means for receiving said first measured distance and said first measured direction and said fourth distance and said fourth direction for calculating a fifth distance between said object and said golf ball.

12. Apparatus for measuring a distance as in claim 11 and further including;
   a) a first converter means for converting said first global position data into first location coordinate data;
   b) a second converter means for converting said second global position data into a second location coordinate data; and
   c) said first data processor means receives said first location coordinate data from said first converter means and receives said second location coordinate data from said second converter means for calculating said third distance and said third direction.

13. Apparatus for a measuring a distance as in claim 12 and in which said first location coordinate data is a first latitude and longitude values and said second location coordinate data is a second latitude and longitude values.

14. Apparatus for measuring a distance as in claim 11 wherein said object is a pin on a green on a hole of said golf course and said fifth distance is a distance ball to pin.

15. Apparatus for measuring a distance as in claim 11 wherein said object is a hazard on a hole of said golf course.

16. Apparatus for measuring a distance as in claim 13 wherein said object is a pin on a green of a hole on said golf course.

17. Apparatus for measuring a distance as in claim 13 and further including:
   a) a golf cart means for transporting golf players along said golf course and said second GPS receiver means is transported on said golf cart means.

18. Apparatus for measuring a distance as in claim 11 and further including:
   a) a golf cart means for transporting said second GPS receiver means along said golf course; and
   b) said measuring means is mounted on said golf cart means.

19. Apparatus for measuring a distance as in claim 18 and in which said second GPS receiver means is mobile and is mounted on said golf cart means.

20. Apparatus for measuring a distance as in claim 11 and in which said first GPS receiver means is fixed and said second GPS receiver means is mobile and said apparatus further includes;
   a) a golf cart means for transporting said second GPS receiver means and said measuring means is mounted on said golf cart means.

21. A system for measuring the distance between an object on a golf course and a golf ball on said golf course comprising:
   a) a first GPS receiver means positioned on or in the vicinity of said golf course, for receiving first location defining data transmitted from one or more satellites in orbit above the earth, said first location defining data defining a location for said first GPS receiver means, said first GPS receiver means spaced from said object a first distance and a first direction, said first distance and said first direction stored for retrieval and use;
   b) a second GPS receiver means on or in the vicinity of said golf course, for receiving second location defining data transmitted from said one or more satellites, said second location defining data defining a second location for said second GPS receiver means, said second GPS receiver spaced from said first GPS receiver an unknown distance and an unknown direction;
   c) a distance and direction measuring means for measuring a second distance and a second direction between said second GPS receiver means and said golf ball on said golf course;
   d) a first data processor means for receiving and calculating said first location defining data and said second location defining data for deriving a third distance and a third direction between said first GPS receiver and said second GPS receiver means;
   e) a second data processor means for receiving and calculating said second distance and said second direction with said third distance and said third direction for deriving a fourth distance and a fourth direction between said first GPS receiver means and said golf ball; and
   f) a third data processor means for retrieving said first distance and said first direction and for receiving said fourth distance and said fourth direction and for calculating said first distance and first direction with said fourth distance and said fourth direction for deriving a fifth distance between said object and said golf ball.

22. A system for measuring as in claim 21 in which said object is a pin on a green of a hole on said golf course.

23. A system for measuring as in claim 21 in which said object is a hazard on a hole on said golf course.

24. A system for measuring as in claim 21 and further including:
   a) a means for converting said fifth distance into yardage.

25. A system for measuring as in claim 21 and further including:
   a) a first converter means for converting said first location defining data into a first location coordinate data;
   b) a second converter means for converting said second location defining data into a second location coordinate data; and,
   c) said first data processor means receives and calculates said first location coordinate data with said second location coordinate data for deriving said third distance and said third direction.

26. A system for measuring as in claim 25 wherein said first location coordinate data is a first latitude value and a first longitude value and said second location coordinate data is a second latitude value and a second longitude value and said first data processor derives a latitude difference value and a longitude difference value which define said third distance and said third direction.

27. A system for measuring a distance between a golf ball on a fairway of a golf course and a pin on a green of a hole on said golf course, wherein a first distance and a first direction between said pin and a fixed location on or in the vicinity of said golf course is known, without defining the location of said pin, said system comprising:

a) a first receiver means for receiving a first global position indicating data transmitted from global position indicating satellites, in orbit above the earth, said first global position indicating data defining a first location for said first receiver means, said first receiver means located at said fixed location;

b) a second receiver means for receiving a second global position indicating data transmitted from said global position indicating satellites, said second global position indicating data defining a second location for said second receiver means, said second receiver means being portable and transported along said golf course;

c) a measuring means for measuring a second distance and a second direction between said second receiver means and said golf ball on said fairway;

d) a first processor means for receiving said first global position indicating data and said second global position indicating data and for mathematically combining said first global position indicating data and said second global position indicating data for deriving a third distance and a third direction of said third distance;

e) a second processor means for receiving and mathematically combining said second distance and said second direction with said third distance and said third direction for calculating a fourth distance and a fourth direction between said first receiver means and said golf ball; and f) a third processor means for receiving and mathematically combining said first distance and said first direction with said fourth distance and said fourth direction for calculating a fifth distance and a fifth direction between said golf ball and said pin.

28. A system for measuring a distance as in claim 27 and further including:

a) a golf cart means for transporting at least golf equipment along said golf course, said second receiver means mounted on said golf cart means.

29. A system for measuring a distance as in claim 28 and in which said measuring means is mounted on said golf cart means.

30. A system for measuring a distance as in claim 27 and further including:

a) a first converter means for converting said first global position indicating data to first location coordinates for defining said first location for said first receiver means in first latitude and longitude coordinates;

b) a second converter means for converting said second global position indicating data to second location coordinates for defining said second location for said second receiver means in second latitude and longitude coordinates; and, c) said first processor means receives and mathematically combines said first latitude and longitude coordinates and said second latitude and longitude coordinates for deriving a latitude value and a longitude value which define said third distance and said third direction.

31. A method for determining the distance between a golf ball on a fairway of a golf course and a pin on a green of said fairway, including the steps of:

a) positioning a first GPS receiver on or in the vicinity of said golf course;

b) measuring a first distance between said pin on said green and said first GPS receiver without determining a location for said pin or said first GPS receiver and determining a first direction of said first distance, relative to a base direction;

c) positioning a second GPS receiver at said golf ball on said fairway;

d) operating said first GPS receiver for receiving first transmitted data from first global position satellites above the earth and for converting said first data into a first location data defining a location for said first GPS receiver;

e) operating said second GPS receiver simultaneous with operation of said first GPS receiver for receiving second data transmitted from second global position satellites above the earth and for converting said second data into a second location data defining a second location for said second GPS receiver;

f) mathematically combining said first location data and said second location data for determining a second distance and a second direction of said second distance; and g) mathematically combining said first distance and said first direction with said second distance and said second direction for determining a third distance and a third direction, said third distance being the distance between said golf ball and said pin.

32. A method for determining the distance as in claim 31 wherein said first GPS receiver is in a fixed location.

33. A method for determining the distance as in claim 32 wherein said second GPS receiver is mobile.

34. A method for determining distance as in claim 33 wherein said second GPS receiver is positioned in juxaposition with said golf ball on said fairway.

* * * * *